United States Patent [19]

Kudo et al.

[11] Patent Number: 4,982,216
[45] Date of Patent: Jan. 1, 1991

[54] FOCUSING DEVICE OF A CAMERA

[75] Inventors: Yoshinobu Kudo; Yoshiaki Hata; Motohiro Nakanishi, all of Osaka, Japan

[73] Assignee: Minolta Camera Kabushiki Kaisha, Osaka, Japan

[21] Appl. No.: 352,263

[22] Filed: May 16, 1989

[30] Foreign Application Priority Data

May 16, 1988 [JP] Japan .................. 63-119758

[51] Int. Cl.[5] ............................................. G03B 13/36
[52] U.S. Cl. ...................................... 354/400; 354/167
[58] Field of Search ............... 354/400, 401, 402, 403, 354/408, 406, 167

[56] References Cited

U.S. PATENT DOCUMENTS

| 4,479,706 | 10/1984 | Takahashi | 354/403 |
| 4,533,227 | 8/1985 | Takahashi | 354/403 |
| 4,650,309 | 3/1987 | Ishida et al. | 354/408 |
| 4,662,735 | 5/1987 | Karasaki et al. | 354/406 |
| 4,772,912 | 9/1988 | Ishida et al. | 354/402 |
| 4,828,383 | 5/1989 | Kunishige et al. | 354/167 |

FOREIGN PATENT DOCUMENTS 57-64204 4/1982 Japan .
59-160129 9/1984 Japan .
62-111223 5/1987 Japan .

Primary Examiner—Russell E. Adams
Attorney, Agent, or Firm—Burns, Doane, Swecker & Mathis

[57] ABSTRACT

There is disclosed a device for correcting and compensating variations of the back focal length caused by temperature changes in a photographic lens system which incorporates at least one lens component made of a plastic material. The device includes a lens drive which axially moves the lens system to obtain a fully focused image of an object to be photographed, and a temperature sensor which senses surrounding temperature conditions and produces output signals representing the sensed temperature condition. A lens control is also provided in the device, and functions in response to the output signals from the temperature sensor to control the lens drive in a manner to compensates any temperature-related variation of the back focal length of the lens system.

4 Claims, 5 Drawing Sheets

|  | Below -30°C | -30° ~ -10° | -10° ~ 10° | 10° ~ 30° | Above 30°C |
|---|---|---|---|---|---|
| C1 | L | H | H | H | H |
| C2 | L | L | H | H | H |
| C3 | L | L | L | H | H |
| C4 | L | L | L | L | H |

FOCUSING DEVICE OF A CAMERA

BACKGROUND OF THE INVENTION

1. Field of the Invention

The present invention generally relates to a focusing device of a camera, and particularly to a focusing device of a camera having an objective lens which includes one or more lens elements made of a synthetic resin material

2. Description of the Prior Art

It has been a common practice in the photographic camera industry to use one or more lens elements made of a synthetic resin material in an effort to decrease the production costs. The lens element made of a synthetic resin material is called "plastic lens element" hereinafter.

However, the plastic lens element has a drawback in which the refractive power thereof is undesirably changed in accordance with the change in temperature thereof. It causes an undesirable change of a back focal length of a whole lens system including the plastic lens element. The change of the back focal length of the whole lens system causes the deviation of the image plane of the lens system from a predetermined focal plane.

Thus, a plurality of methods are considered for correcting or compensating the change of the back focal length of the lens system including the plastic lens. One of such methods is to control the change of the back focal length of the lens system due to the temperature change within a permissible range The other thereof is to shift at least a part of the lens system for compensating the change due to the temperature change. Further, other thereof is to compensate the change of the back focal length of the lens system by an automatic focusing device provided in the camera body.

Japanese Laid-Open Patent Application No. 111,223/1987 discloses to compensate the change of the back focal length of the objective lens system due to the temperature change by detecting a temperature of an optical system provided in an automatic focus detection device Japanese Laid-Open Patent Application No. 160,129/1984 discloses to change a base line length of a range finder device provided in the camera for compensating the change of the back focal length. Japanese Laid-Open Patent Application No. 64,204/1982 discloses to modify a distance signal indicative of a distance to an object in accordance with a temperature signal produced, for example, by a temperature detector, for compensating the change of the back focal length

SUMMARY OF THE INVENTION

It is an object of the invention to provide an improved device for effectively and accurately correcting or compensating the change of the back focal length of the objective lens system due to the temperature change.

It is another object of the invention to provide a simple and inexpensive and yet reliable device for effectively correcting or compensating the change of the back focal length of the objective lens system including at least one plastic lens element due to the temperature change.

It is still another object of the invention to provide an novel device for compensating thermally induced changes of the back focal length of the objective lens system by adjustably controlling the axial displacement of at least a part thereof.

In accomplishing the above object of the invention, it is so arranged that, a distance to an object to be focused is detected by a detecting means, and a desired position of the objective lens is determined, and the lens is driven to locate at the desired position by a driving means, and a temperature signal is produced by a detecting means, and the driving means is controlled so that the position is modified from the desired position in accordance with the temperature signal.

According to another feature of the invention, arrangement is so made that the object lens is shiftable within either of a first movable range and a second movable range, and either one range is selected in accordance with the detected temperature.

According to a further feature of the invention, it is so arranged that a focusing position of the object lens is determined within a predetermined movable range corresponding to a predetermined temperature range, and also the position is shifted beyond the predetermined movable range when the detected temperature is out of a predetermined temperature range Thus, the change of the back focal length in the lens system due to changing temperature conditions is always corrected.

BRIEF DESCRIPTION OF THE DRAWINGS

The invention itself as well as other objects, features, aspects and advantages thereof will become more apparent from the following detailed description of the present invention when taken in conjunction with the accompanying drawings, wherein.

DETAILED DESCRIPTION OF PREFERRED EMBODIMENTS

Figure 1:
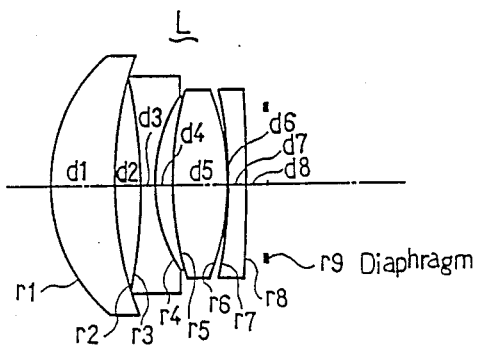
FIG. 1 is a schematic illustration showing one typical arrangement of a photographic lens system having at least one plastic lens component therein, to which the invention is suitably applied.

Referring now to FIG. 1, there is illustrated a cross section of an objective lens system of a photographic camera according to one preferred embodiment of the invention, construction of which are presented in Table 1.

The objective lens system has a focal length or distance of 35 mm, and a F-number of 2.6. A fourth lens element, counted from the object side, in the lens system is made of a synthetic resin material including acryl polycarbonate as the major component. In an attempt to decrease a change of the back focal length due to the temperature change, the plastic fourth lens element is designed to have a weak refractive power in comparison with that of the other elements. However, it should be pointed out that other requirements of the whole lens system for an ever-compact design with ever-greater overall operating capacity demands that the plastic lens must have some refractive power. Calculated values representing deviations of the back focal length of the objective lens system at several temperature conditions are listed in Table 2.

As can be understood from Table 2, in comparison with the back focal length of the objective lens system at the temperature of 20° C., the one at 50° C. decreases by 0.08 mm, while the back focal length at −20° C. increases by 0.11 mm.

It is assumed that the refractive index of acryl polycarbonate, which is the major constituent material, changes as $-10 \times 10^{-5}/°$ C. and its coefficient of linear expansion is assumed to be $900 \times 10^{-7}/°$ C.

It is also assumed that the objective lens system shown in FIG. 1 and in Table 1 is built into a typical compact camera with the known zone focusing function. The zone focusing function is defined by shifting the objective lens system at one of a plurality of points which are predetermined by dividing a focusing range from an infinity focusing position to a nearest focusing position into the plurality of points taking the depth of focus of the objective lens systems into consideration.

In general, if δ represents a diameter of permissible circle of confusion of a camera, a depth of field of an objective lens system d can be expressed as follows:

$$d = \frac{u(u-f)\delta F}{f^2 \pm (u-f)\delta F}$$

wherein, f represents a focal length of the objective lens system; F represents an F-number thereof; u represents a distance from a front principal point of the objective lens system to an object to be focused.

Figure 2:
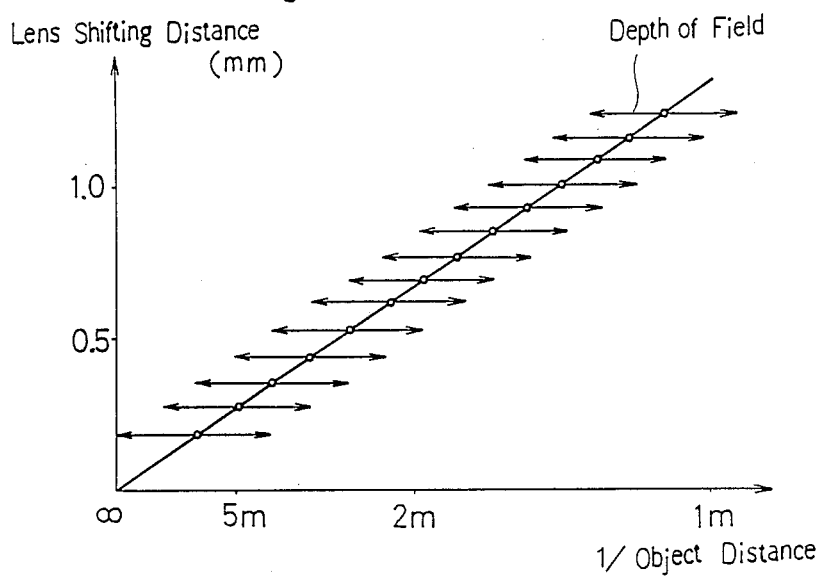
FIG. 2 is a graphic representation showing relative relations between the depth of field and the lens shifting distance of the lens system of FIG. 1.

FIG. 2 illustrates various depths of field of the objective lens system shown in FIG. 1, in relation to the distance to an object to be focused (hereinafter also referred to as the "object distance") and the axial shifting distance of the objective lens system.

In the lens system, when $\delta = 2 \times 0.033$, the depth of field at the in-focus point of 7.2m covers from 3.62m to ∞, and at the in-focus point of 4.93 m, the depth of field covers the range of 2.95-15.4 m, and so on.

In FIG.2, the vertical axis indicates the axial shifting distance of the objective lens system from its infinity focusing position and the horizontal axis indicates the inverse of the object distance of the objective lens system. Small circles (o) in the drawing figure shows focusing lens-stop points or locations. In the illustrated embodiment, fourteen lens-stop points enable the photographic camera to form in-focused images within the depth of field range between ∞ and 1.0 m. While the depths of field for these fourteen stop points partially overlap one another, the overlapping relations are provided in order to compensate AF errors and mechanical errors related to the axial drive for the lens system. Table 3 shows the relation between each lens stop point and its corresponding axial shifting distance from the infinity focusing position.

Figure 3:
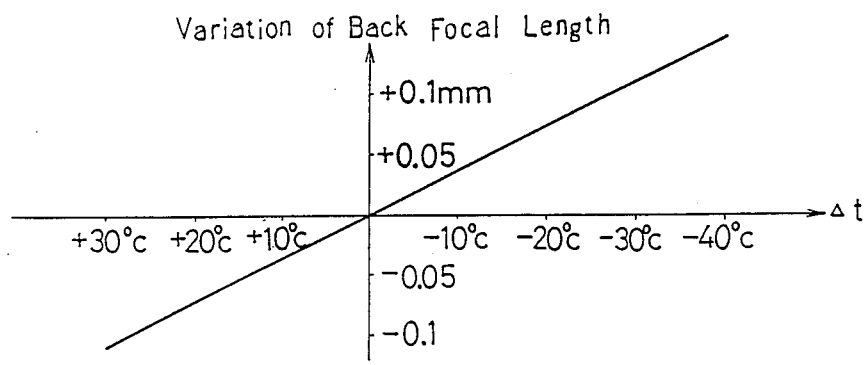
FIG. 3 represents a variation of the back focal length of the lens system of FIG. 1 due to the change of temperature condition.

Referring now to FIG. 3, there are illustrated amounts of change in the back focal length of the objective lens system with varying temperatures conditions. As shown, the change of the back focal length increases with temperatures.

Figure 4:
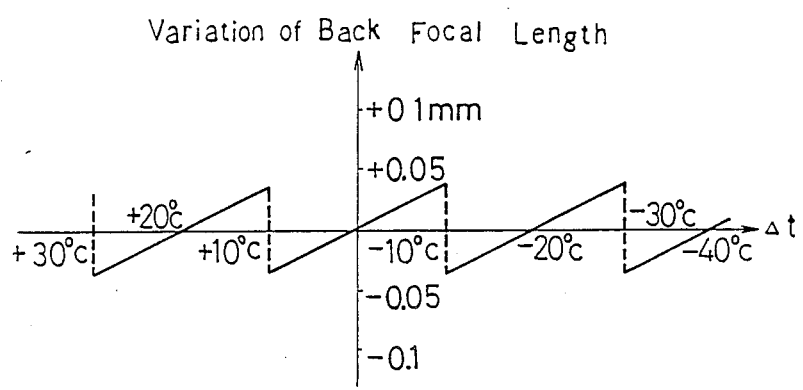
FIG. 4 is a curve similar to that of FIG. 3, showing improved, limited fluctuations of the back focal length in the lens system according to a preferred embodiment of the present invention.

In order to effectively avoid undesired excessive change of the back focal length, it is contemplated to use a temperature sensor, which detects and indicates a predetermined amount of temperature variation, for example, of 10° C. When the temperature change exceeds that amount as detected by the thermal sensor, any neighboring lens-stop point will be selected to get rid of detrimental effects of expansion or shrinkage in the plastic lens, for accurate and successful focusing For instance, if the lens system is currently clicked in at the 7th stop point, and the temperature variation goes beyond the 10° C. range, then the lens system is switched over to the next 8th stop location. With this unique arrangement, the shifting of the back focal length due to temperature changes is effectively controlled to contain it within limited amounts as shown in FIG. 4.

Figure 5:
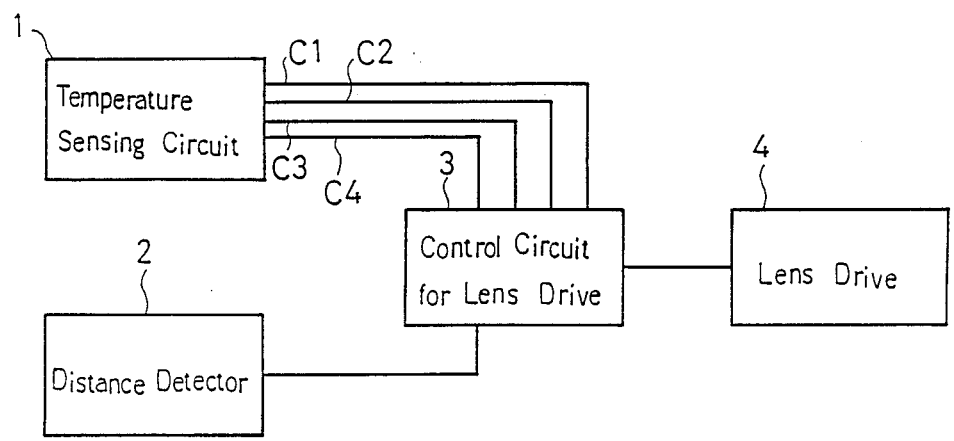
FIG. 5 is a block diagram schematically showing the preferred embodiment of the invention.

FIG. 5 illustrates in block diagram the arrangement of a temperature compensation device according to the invention. The device includes a temperature sensing circuit 1, a distance detector 2 for measuring the distance to the object to be focused. Also included in the compensation device are a control circuit 3 for controlling axial movement of the lens system, and a lens drive 4 for axially moving the lens system.

The distance detector 2 operates to produce an output signal indicating a distance to the object selected among the fourteen zone numbers (No.1 to No.14) as shown in Table 3. The distance indicating zone signal is supplied to the lens control circuit 3. Provided also to the lens control circuit 3 by the temperature sensing circuit 1 are signals representing temperature conditions, as will be discussed later with reference to FIG. 8.

In operation, the lens control circuit 3 functions to control the lens drive 4 in response to the zone signals from the the distance detector 2. And the control circuit 3 finds out the current temperature condition based on the signals supplied from the temperature sensing circuit 1, which indicate either one of the following five temperature conditions: below −30° C.; between −30° C.; to −10° C.; between −10° C. to 10° C.; between 10° C. to 30° C.; and, above 30° C. When the sensed temperature is below −30° C., the control circuit 3 shifts down the zone number from the distance detector by 2; between −30° C. to −10° C., the control circuit shifts down the zone number by 1; between −10° C. to 10° C. the circuit makes no shift of the zone number; between 10° C. to 30° C., the control circuit shifts up the zone number by 1; and, above 30° C., it shifts up the zone number by 2. Then the control circuit 3 controllably operates the lens drive 4 in the particular focusing zone which is determined and selected by the shifted zone number.

Table 4 show the relation between the shifted zone number and its corresponding lens shifting amount.

In this manner, according to the embodiment, for all the focusing zones assigned to the distance detector, additional axial lens shifting is provided in amounts sufficient to offset the deviation of the back focal length in the photographic lens system all through the temperature range in which the lens system is expected to operate, and these additional axial displacements are, therefore, effective in compensating any unwanted influence of the thermally caused expansion and shrinking of the plastic lens component on the focusing function of the lens system, thus assuring accurate image focusing throughout the entire focus zones.

Figure 6:
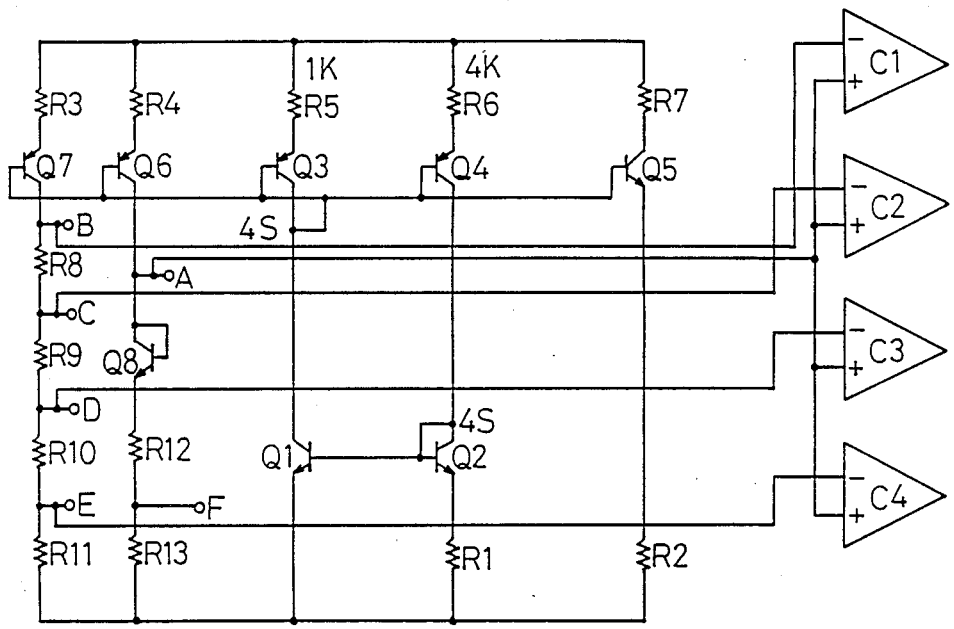
FIG. 6 is a circuit diagram showing an overall arrangement of a temperature sensing circuit which is incorporated in the device of FIG. 5.

One preferred embodiment of the temperature sensing circuit 1 of FIG. 5 is shown in schematic circuit diagram in FIG. 6. In the arrangement of the circuit, transistors Q1 and Q2 have a device area ratio of 1 : 4. Consequently, following equation is yielded:

$$\frac{kT}{q} \ln \frac{I1}{i_o} = \frac{kT}{q} \ln \frac{I2}{i_o \times 4} + I2 \cdot R1 \quad (1)$$

where
- I1 collector current of transistor Q1,
- I2: collector current of transistor Q2,
- $i_o$: saturation current of transistors Q1 and Q2
- R1: electrical resistance of resistor R1,
- T: absolute temperature, and
- k: (temperature) coefficient.

Also when transistors Q3 and Q4 have an area ratio of 4 : 1, the ratio of electrical resistance between resistors R5 and R6 is 1 : 4, then the following equation is given:

$$\frac{kT}{q} \ln \frac{I3}{i_o \times 4} + R5 \cdot I3 = \frac{kT}{q} \ln \frac{I2}{i_o} + R6 \cdot I2 \quad (2)$$

From the above equation (2), the ratio of the collector currents I3 and I2 is calculated to be 4 : 1.

In other words, the ratio of collector currents between transistor Q1 and Q2 is 4 : 1.

Under the collector current conditions, the amount of current that satisfies equation (1) is obtained by substituting I1 with 4·I2 as follows:

$$\frac{kT}{q} \ln \frac{4 \cdot I2}{i_o} =$$

$$\frac{kT}{q} \ln \frac{I2}{i_o \times 4} + I2 \cdot R1 \frac{kT}{q} \ln 16 = I2 \cdot R1$$

$$I2 = \left( \frac{kT}{q} \ln 16 \right)/R1$$

It is clear from the above that I2 is in inverse proportion to R1, and is in direct proportion to absolute temperature T. The combination of transistor Q7 and resistor R3, and the combination of transistor Q6 and resistor R4 form a mirror circuit with the combination of transistor Q3 and resistor R5. If R3=R4=4KΩ, then an identical current is flown through transistor Q7, Q6 and Q3, respectively. It is noted here that the voltage $V_E$ at a terminal E is expressed as follows:

$$V_E = R11 \times 4 \times \frac{(kT/q)\ln 16}{R1}$$

In a similar manner, voltages $V_D$, $V_C$ and $V_B$ at terminals D, C and B, respectively, are expressed as in the following:

$$V_D = (R11 + R10) \times 4 \times \frac{(kT/q)\ln 16}{R1}$$

$$V_C = (R9 + R10 + R11) \times 4 \times \frac{(kT/q)\ln 16}{R1}$$

$$V_B = (R8 + R9 + R10 + R11) \times 4 \times \frac{(kT/q)\ln 16}{R1}$$

It is obvious from the above that any of the terminal voltages is in direct proportion to the absolute temperature.

Note that the transistor Q8 is in diode connection, and the voltage across this transistor is expressed as follows:

$$\frac{kT}{q} \ln \frac{\{4(kT/q)\ln 16\}/R1}{i_o}$$

If, $$4 \frac{(kT/q)\ln 16}{R1} = i_M$$

then the temperature coefficient for the voltage V8 across the transistor Q8 can be calculated as follows (at room temperature, it makes no great difference if the voltage is assumed to be constant):

$$\left. \frac{dV8}{dT} \right|_{i_M = \text{const}} = \frac{k}{q} \ln i_M - \left\{ \frac{k}{q} \ln i_o + \frac{kT}{q} \frac{d}{dT} (\ln i_o) \right\}$$

$$= \frac{k}{q} \ln \frac{i_M}{i_o} - \frac{kT}{q} \frac{d \ln i_o}{dT}$$

$$= \frac{Vbe}{T} - \frac{kT}{q} \frac{d}{dT} (\ln \alpha - \phi/kT)$$

where $\phi = 1.21 - 4.1 \times 10^{-4} \cdot T[eV]$ $$\ln i_o = \ln \alpha - \frac{1.21}{kT} + \frac{4.1 \times 10^{-4}}{kT}$$

$$\therefore \frac{d}{dT} (\ln \alpha - \phi/kT) = \frac{1.21}{kT}$$

$$= \frac{Vbe}{T} - \frac{kT}{q} - \frac{1.21}{kT^2} = \frac{Vbe - 1.21}{T} [V/°C]$$

If Vbe at room temperature is about 700 mV, the temperature coefficient for the voltage V8 across the transistor Q8 would be −1.7 mV/° C., which indicates that it has a negative gradient with temperature (the terminal voltage $V_A$).

Figures 7, 8:
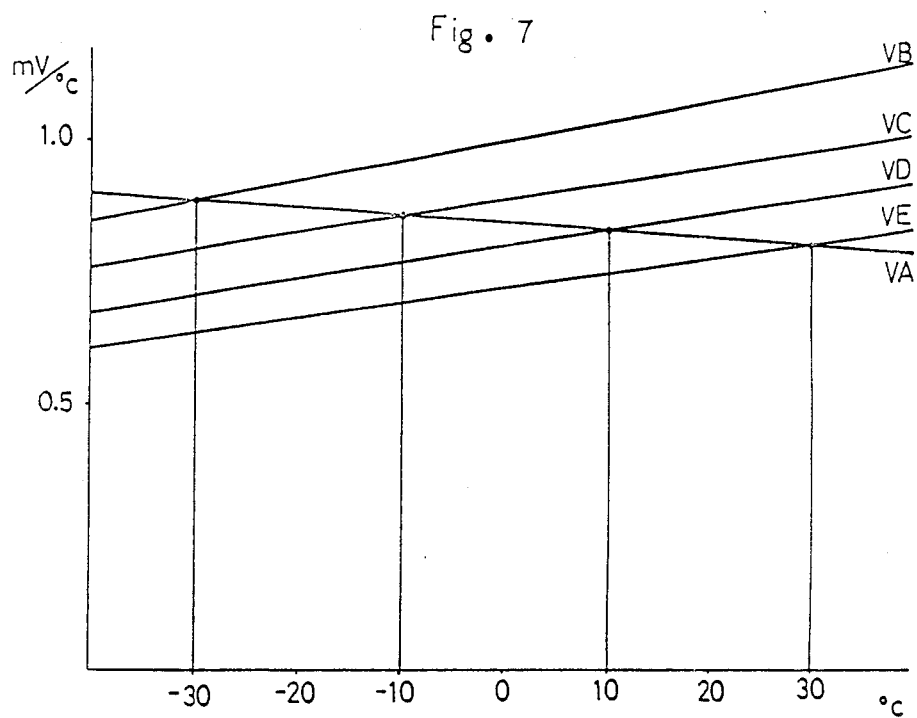
FIG. 7 are curves showing respective changes of terminal voltages that appear in the the temperature sensing circuit of FIG. 6.
FIG. 8 shows output signals provided by the sensing circuit of FIG. 6, indicating various temperature conditions as divided into several temperature ranges.

Having reference to FIG. 7, there are graphically illustrated temperature coefficients for all the terminal voltages $V_A$ to $V_E$. By preselecting the resistance values for the resistors R8, R9, R10, R11, R12, R13 so that the temperature coefficient line for the terminal voltage $V_A$ intersects the temperature coefficient curves for the terminal voltages $V_B$, $V_C$, $V_D$, $V_E$ at temperatures −30° C. −10° C., 10° ., 30° C., respectively, it is possible to sense these temperatures. Referring again to FIG. 6, resistors R12 and R13 are provided to adjust the temperature coefficients for the terminal voltages such that the temperature coefficient curves cross at the predetermined temperature levels. A transistor Q5 function to start up the whole temperature sensing circuit Resistors R7 and R2 control the current flow through the transistor Q5. The temperature sensing circuit 1 of FIG. 6 also has a series of comparators C1 to C4 for detecting the temperature conditions for the thermal gradient curves of the terminal voltages $V_B$, $V_C$, $V_D$ and $V_E$, respectively, relative to the preselected temperature values. As shown, the non-inverted inputs of the comparators C1, C2, C3 and C4 are coupled together to the common terminal A, while their inverted inputs are connected to the terminals B, C, D and E, respectively. In operation of the circuit, the comparators C1 to C4 generate high output signals "H" or low output signals "L", the former representing that the temperature gradients for the associated terminal voltages are higher than that of the terminal voltage $V_A$ in specified temperature ranges, as listed in FIG. 8, and the latter indicating lower temperature gradients. In this arrangement and manner of operation, it is possible to know the temperature conditions to which the lens system is currently exposed.

Figure 9:
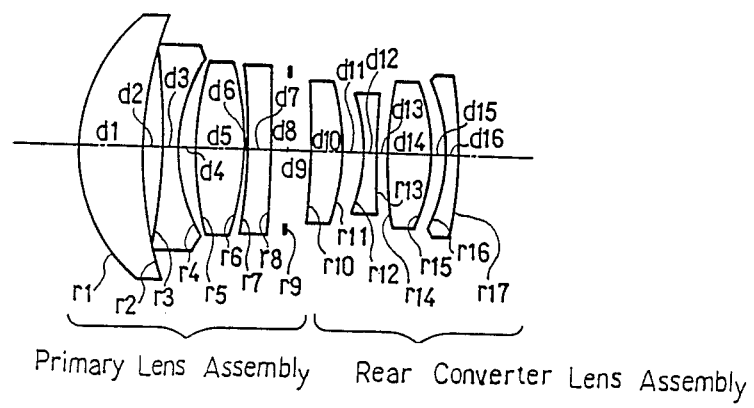
FIG. 9 is a schematic illustration showing another typical arrangement of a photographic lens system having a rear converter lens as well as at least one plastic lens component therein, to which the invention is suitably applied.

FIG. 9 illustrates the arrangement of a lens system according to another preferred embodiment of the invention, the related specifications of which are shown in Table 5. As shown in FIG. 9, the whole lens system comprises a first primary lens assembly L and a secondary rear converter lens assembly RC which can be located behind the first primary lens assembly L and can be retracted to the outside of the photographic path. The first primary lens assembly L is essentially the same in construction as the primary lens system in the preceding embodiment of FIG. 1. The primary lens assembly L is only located at the photographic path in a wide condition, while both of the assemblies L and RC are located thereat in a telephoto condition. With the arrangement, the focusing function is usually performed by shifting the primary lens assembly.

In the optical system of FIG. 9, the deviation of the back focal length at a temperature of $+30°$ C. varies with the lens shifting amount as represented in Table 6.

With this type of the optical lens arrangement, it is possible, according to the novel concept of the present invention, to handle separately and independently information relating to temperature conditions and information relating to the object distances obtained in automatic focusing mode of operation. Accordingly it is possible, for instance, to deal with the situation where an object more than one meter away is to be photographed under certain temperature condition, by shifting the lens-focus stop point one location further away.

As is understood readily from the foregoing detailed discussion, this invention most effectively overcomes the problems of thermally induced fluctuations of the back focal length inherent in the prior art photographic camera lenses which employs one or more lenses made of plastics. Specifically, as has been shown and described, the new and novel device of the invention for correcting and compensating the variations of back focal length has a temperature-sensitive component that constantly monitors the current temperature. Based upon temperature relating information provided by the sensor component, when it is decided that the fluctuation of the back focal length exceeds a predetermined quantity, then the device of the invention operates to adjustably select a different and suitable focusing stop-point on the lens assembly for a proper zone focusing. The device of the invention is simple in construction, inexpensive to manufacture, and highly effective as well as reliable in its operation to offset thermally induced variations of the back focal length in the photographic lens assembly employing at least one plastic lens component.

Although the present invention has been described in detail with reference to specific embodiment(s), this description is not meant to be construed in a limiting sense. Various modifications of the disclosed embodiment(s), as well as other embodiments of the invention, will become apparent to persons skilled in the art upon reference to the description of the invention. It is therefore contemplated that the appended claim(s) will cover any such modifications or embodiments as fall within the true scope of the invention.

TABLE 1

| | $f = 35.0$ | | $1:2.60$ | $2\omega = 63.4°$ | |
|---|---|---|---|---|---|
| | Radius of Curvature | Axial Distance | | Refractive Index | Abbe Number |
| r1 | 11.965 | d1 | 4.50 | n1 1.69680 | $\nu1$ 56.47 |
| r2 | 24.785 | d2 | 1.80 | | |
| r3 | −35.651 | d3 | 1.20 | n2 1.64769 | $\nu2$ 33.88 |
| r4 | 11.098 | d4 | 1.10 | | |
| r5 | 19.423 | d5 | 4.00 | n3 1.77250 | $\nu3$ 49.77 |
| r6 | −19.423 | d6 | 0.15 | | |
| r7* | −28.159 | d7 | 1.30 | n4 1.49140 | $\nu4$ 57.82 |
| r8 | −91.526 | d8 | 1.30 | | (Plastic) |
| r9 | Diaphragm | | | | | r7* Aspheric Coefficients
a = 0.0
b = −0.12491 × 10$^{-4}$
c = −0.42177 × 10$^{-7}$
d = 0.11229 × 10$^{-7}$
e = 0.44337 × 10$^{-12}$
f = 0.85153 × 10$^{-16}$

TABLE 2

| | |
|---|---|
| Back Focal Length at 50° C. | 24.97 mm |
| Back Focal Length at 20° C. | 25.05 mm |
| Back Focal Length at −20° C. | 25.16 mm |

TABLE 3

| Zone No. | Lens Stop Points (m) | Lens Shifting Distance (mm) |
|---|---|---|
| 1 | 7.20 | 0.172 |
| 2 | 4.93 | 0.252 |
| 3 | 3.75 | 0.333 |
| 4 | 3.04 | 0.413 |
| 5 | 2.55 | 0.494 |
| 6 | 2.21 | 0.574 |
| 7 | 1.94 | 0.655 |
| 8 | 1.74 | 0.735 |
| 9 | 1.57 | 0.816 |
| 10 | 1.44 | 0.896 |
| 11 | 1.33 | 0.977 |
| 12 | 1.23 | 1.057 |
| 13 | 1.15 | 1.138 |
| 14 | 1.08 | 1.218 |

TABLE 4

| Zone No. | Lens Shifting Distance (mm) | Zone No. | Lens Shifting Distance (mm) |
|---|---|---|---|
| −1 | 0.012 | 8 | 0.735 |
| 0 | 0.092 | 9 | 0.816 |
| 1 | 0.172 | 10 | 0.896 |
| 2 | 0.252 | 11 | 0.977 |
| 3 | 0.333 | 12 | 1.057 |
| 4 | 0.413 | 13 | 1.138 |
| 5 | 0.494 | 14 | 1.218 |
| 6 | 0.574 | 15 | 1.298 |
| 7 | 0.655 | 16 | 1.378 |

TABLE 5

| | f = 68.0 | 1:4.91 | 2ω = 35.3° | |
|---|---|---|---|---|
| | Radius of Curvature | Axial Distance | Refractive Index | Abbe Number |
| r1 | 11.807 | d1 4.500 | N1 1.69680 | ν1 56.47 |
| r2 | 26.434 | d2 1.500 | | |
| r3 | −35.323 | d3 1.000 | N2 1.63980 | ν2 34.55 |
| r4 | 11.087 | d4 1.200 | | |
| r5 | 20.960 | d5 3.500 | N3 1.75450 | ν3 51.57 |
| r6 | −19.444 | d6 0.250 | | |
| r7* | −33.632 | d7 1.600 | N4 1.49140 | ν4 57.82 |
| r8 | −191.145 | d8 1.200 | | |
| r9 | Diaphragm | d9 1.700 | | |
| r10* | −49.369 | d10 2.300 | N5 1.58400 | ν5 31.00 |
| r11 | −14.201 | d11 1.361 | | |
| r12 | −11.874 | d12 1.000 | N6 1.85000 | ν6 40.04 |
| r13 | 68.902 | d13 0.750 | | |
| r14 | 30.036 | d14 3.000 | N7 1.59551 | ν7 39.22 |
| r15 | −12.666 | d15 1.000 | | |
| r16 | −11.763 | d16 1.000 | N8 1.85000 | ν8 40.04 |
| r17 | −26.115 | | | | r7* Aspheric Coefficients
a = 0.0
b = −0.15615 × $10^{-4}$
c = 0.11343 × $10^{-6}$
d = 0.12120 × $10^{-7}$
e = 0.83971 × $10^{-12}$
f = 0.38949 × $10^{-16}$ r10* Aspheric Coefficients
a = 0.0
b = 0.36475 × $10^{-4}$
c = −0.78848 × $10^{-7}$
d = 0.22959 × $10^{-8}$
e = 0.43995 × $10^{-10}$
f = 0.29415 × $10^{-14}$

TABLE 6

| Distances to the Object (m) | Shifts in the Back Focal Length (mm) |
|---|---|
| ∞ | 0.083 |
| 1.0 | 0.051 |
| 0.5 | 0.008 |

What is claimed is:

1. A focusing device of a camera, comprising:
an object lens including at least one lens element made of synthetic resin material;
means for detecting a distance to an object to be focused to determine a desired position of the objective lens;
means for detecting a temperature to produce a temperature signal representing the detected temperature;
means for driving the objective lens to locate the objective lens at a position; and
means for controlling the lens driving means so that the position at which the objective lens is located is modified from the desired position in accordance with the temperature signal.

2. A focusing device as claimed in claim 1, wherein the lens driving means for selecting one of a plurality of positions at which the objective lens can be located.

3. A focusing device of a camera, comprising:
an object lens including at least one lens element made of a synthetic resin material, said objective lens being shiftable within either of a first movable range and a second movable range different from each other;
means for detecting a distance to an object to be focused;
means for driving the objective lens in accordance with the distance detected by the distance detecting means;
means for detecting a temperature to produce a temperature signal representing the detected temperature; and
means for selecting one of the first and second movable ranges in accordance with the temperature detected by the temperature detecting means.

4. A focusing device of a camera, comprising:
an object lens including at least one lens element made of a synthetic resin material;
means for detecting a distance to an object to be focused;
means for driving the objective lens to a focusing position determined in accordance with the distance detected by the distance detecting means within a predetermined movable range corresponding to a predetermined temperature range;
means for detecting a temperature; and
means for shifting the focusing position of the objective lens beyond the predetermined movable range if the temperature detected by the temperature detecting means is out of the predetermined temperature range.

* * * * *